United States Patent
Farid

(10) Patent No.: US 8,460,000 B2
(45) Date of Patent: Jun. 11, 2013

(54) COMPUTER IMPLEMENTED METHOD FOR FACILITATING PROSCRIBED BUSINESS OPERATIONS

(76) Inventor: Tariq Farid, Cheshire, CT (US)

(*) Notice: Subject to any disclaimer, the term of this patent is extended or adjusted under 35 U.S.C. 154(b) by 788 days.

(21) Appl. No.: 12/272,843

(22) Filed: Nov. 18, 2008

(65) Prior Publication Data

US 2010/0124736 A1   May 20, 2010

(51) Int. Cl.
*G09B 19/00* (2006.01)

(52) U.S. Cl.
USPC ........................................................ 434/219

(58) Field of Classification Search
USPC ................... 434/350, 323, 322, 219
See application file for complete search history.

(56) References Cited

U.S. PATENT DOCUMENTS

| | | | | |
|---|---|---|---|---|
| 3,596,388 A * | 8/1971 | Shorten | | 40/657 |
| 5,788,504 A * | 8/1998 | Rice et al. | | 434/219 |
| 6,157,808 A * | 12/2000 | Hollingsworth | | 434/350 |
| 6,419,496 B1 * | 7/2002 | Vaughan, Jr. | | 434/322 |
| 6,606,480 B1 * | 8/2003 | L'Allier et al. | | 434/362 |
| 6,705,869 B2 * | 3/2004 | Schwartz | | 434/219 |
| 6,755,659 B2 * | 6/2004 | LoSasso et al. | | 434/219 |
| 6,921,266 B2 * | 7/2005 | Kon | | 434/219 |
| 7,124,059 B2 * | 10/2006 | Wetzer et al. | | 702/184 |
| 7,160,113 B2 * | 1/2007 | McConnell et al. | | 434/365 |
| 2002/0142278 A1 * | 10/2002 | Whitehurst et al. | | 434/350 |
| 2003/0186199 A1 * | 10/2003 | McCool et al. | | 434/219 |
| 2003/0186209 A1 * | 10/2003 | Kamikawa et al. | | 434/350 |
| 2004/0014016 A1 * | 1/2004 | Popeck et al. | | 434/322 |
| 2004/0224293 A1 * | 11/2004 | Penning et al. | | 434/219 |
| 2006/0047559 A1 * | 3/2006 | Jacoby et al. | | 705/10 |
| 2006/0127865 A1 * | 6/2006 | Siders et al. | | 434/219 |
| 2007/0150371 A1 * | 6/2007 | Gangji | | 705/26 |
| 2007/0185754 A1 * | 8/2007 | Schmidt | | 705/9 |
| 2007/0192715 A1 * | 8/2007 | Kataria et al. | | 715/764 |
| 2008/0301152 A1 * | 12/2008 | Kollgaard et al. | | 707/10 |

OTHER PUBLICATIONS www.certilearn.com dated Dec. 12, 2008, 6 pages.
www.elearning4franchisors.com dated Dec. 12, 2008, 8 pages.

* cited by examiner

*Primary Examiner* — Robert J Utama
(74) *Attorney, Agent, or Firm* — Gerald R. Boss

(57) ABSTRACT

In a computer implemented method for facilitating proscribed business operations, software operable with a computer having a display associated therewith includes a training module and an instruction module, each accessible by a user. The training module includes at least one training session selectable by the user, and the instruction module includes at least one instruction set selectable by the user. Upon selection of one of the training sessions step-by-step training instructions are displayed for performing one or more tasks. The software is operable to record and store information relevant to the selected training sessions in a database. Upon selection of one of the instruction sets, the software is operable to display step-by-step instructions for performing one or more tasks. The software is remotely changeable and remotely updatable.

5 Claims, 1 Drawing Sheet

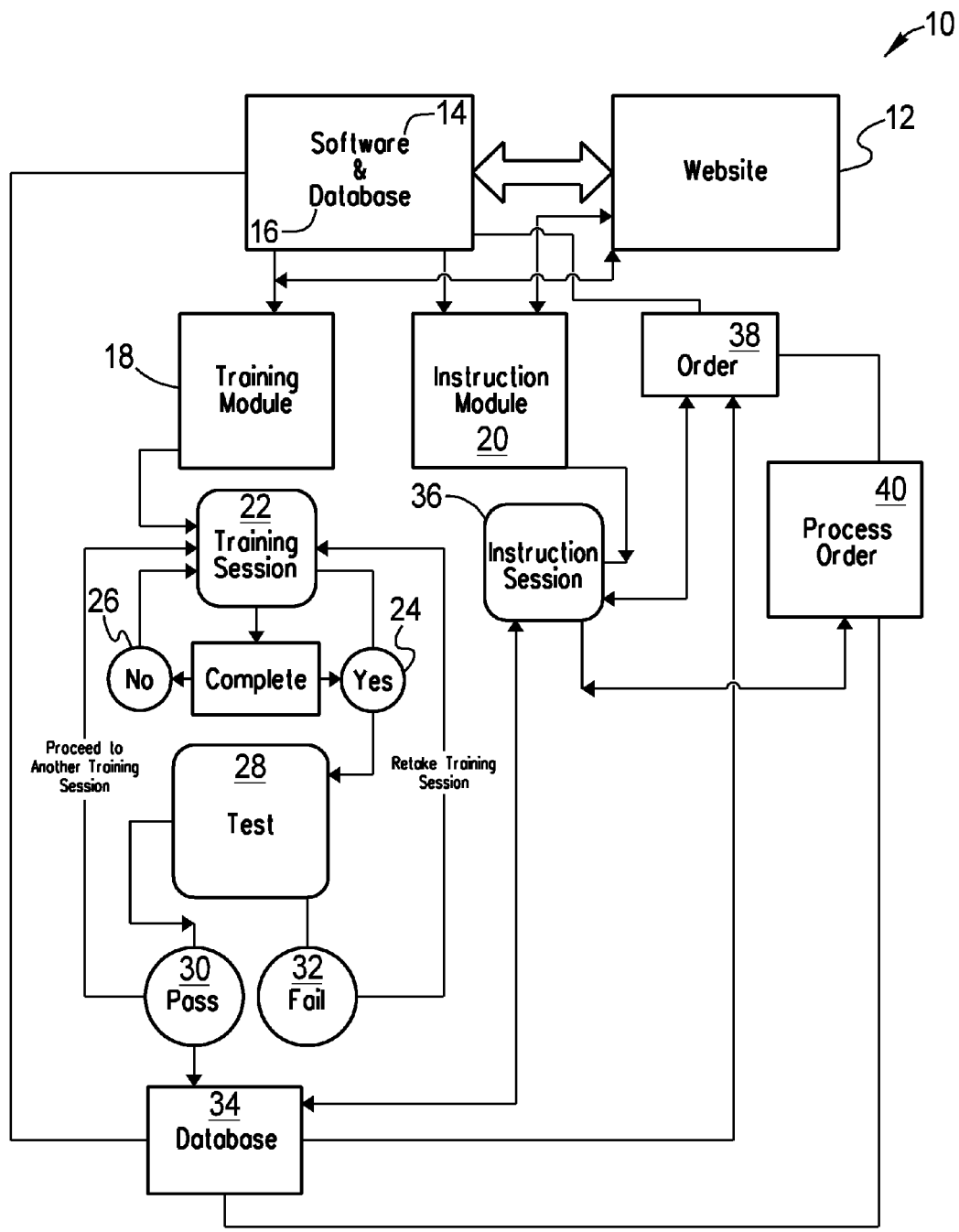

COMPUTER IMPLEMENTED METHOD FOR FACILITATING PROSCRIBED BUSINESS OPERATIONS

FIELD OF THE INVENTION

The present invention is generally directed to conducting training and/or giving instructions and is more specifically directed to a computer implemented method for providing said training and instruction.

BACKGROUND

Consistency among related businesses, remotely located facilities associated with a particular business, and/or among a franchisor and franchisees is sometimes challenging to achieve. In addition, ensuring that instructions and information is disseminated to such entities in an appropriate and timely manner can also prove difficult. For example, in franchisor/franchisee relationships, it may be important that business practices be conducted in the same manner and as instructed by the franchisor, in each franchisee location. Once a franchisor issues such instructions, it can prove difficult and time consuming to update such instructions or to ensure that the instructions were conveyed in the proper manner.

The same logic is true where personnel undergo training at remote and/or various different locations. In general, training for one or more proscribed business operations should be conducted consistently and in the same or a desired manner. Ensuring that such training is accomplished in the desired manner can be difficult to monitor. In addition, it can also prove difficult to ascertain whether or not such training was completed successfully and whether those being trained retained what they were taught.

SUMMARY

In one aspect a method is described for facilitating proscribed business operations whereby software is provided and is operable with a computer having a display associated therewith. The software includes a training module and an instruction module. The training and the instruction module are accessible by a user via the computer. As used herein, the term "computer" should be broadly construed to mean, but not be limited to, laptop, notebook and desktop computers, as well as, personal digital assistants, cellular phones, smart phones, blackberry phones, and the like. The training module includes at least one training session that is selectable by the user. Similarly, the instruction module includes at least one instruction set that is selectable by the user. Upon selection of one of the training sessions by the user, the software, the computer, and the display cooperate to provide and display step-by-step training instructions for performing one or more tasks. The software is operable to record information relevant to the selected training sessions and store at least a portion of that information in a database. Upon selection of one of the instruction sets, the software, the computer, and the display are cooperable to provide and display step-by-step instructions for performing one or more tasks. The software can be remotely changed and updated.

The present invention resides in another aspect in a method for facilitating proscribed business operations whereby a website is established having software operable therewith to provide information related to the proscribed business operations. The information can be provided upon, or subsequent to accessing the website. Means are provided to allow users to access, via the website, a training module and an instruction module. The training module includes at least one training session that is selectable by the user. Similarly, the instruction module includes at least one instruction set that is selectable by the user. Upon selection of one of the training sessions, the user is provided with step-by-step training regarding the performance of one or more tasks. Information regarding selected training sessions can be tracked and stored in a database. Upon selection of one of the instruction sets, step-by-step instructions are provided for performing one or more tasks. In addition, means are provided for allowing changes or additions to be made to at least one of the website and the software.

In an embodiment that employs either of the above-described methods, means are provided that allow for the entry of order information and the processing of orders. Upon receipt of an order, information relevant thereto is entered into the database. The software associated with the database can determine such things as the equipment and materials needed to complete the order. In addition, step-by-step instructions can be provided to the user on a display, such as, but not limited to a standard monitor or a touch-screen monitor. Orders may also be tracked and alerts provided to a user when an order needs to be prepared. If several orders are to be prepared within a given time frame, the software can be operable to display what is needed and/or what needs to be prepared within the time frame.

For example, if cut fruit arrangements are to be prepared, the orders for a given day can be accessed and the number and types of fruit to be cut, as well as the decorative cuts to be made can be displayed. The instructions for preparing the cut fruit as well as the equipment needed can also be shown. The software and database can also be operable to track inventory and provide alerts when supplies and/or other items need to be ordered or otherwise reach predetermined levels. Information regarding quantities to be ordered can also be displayed or otherwise provided. The alerts can be made via e-mail, text messaging, by telephone, fax or the like.

In another embodiment, the training module is operable to administer a test upon a user completing a training session. The training module and the software associated therewith are further operable to score the test to determine if the user passed or failed the test based on predetermined criteria. Preferably, the user is required to pass the test before being allowed to access other training sessions.

BRIEF DESCRIPTION OF THE DRAWINGS

The sole FIGURE in this application is a flowchart illustrative of an embodiment of a computer implemented method for facilitating proscribed business operations.

DETAILED DESCRIPTION

As shown in the sole FIGURE, an exemplary embodiment of a computer implemented method for facilitating proscribed business operations is generally designated by the reference number 10. The method 10 includes establishing a website 12 accessible by one or more users. Software 14 and a database 16 are in communication with as well as operable with the website 12. The software 14 includes a training module 18 and an instruction module 20, each accessible by one or more users via the website 12.

A user upon accessing the training module 18 can choose from one or more training sessions 22 on any one of a variety of different topics and/or methods. For example, if the user is a franchisee and the website is hosted by or affiliated with a franchisor who desires consistent training among the franchisees, the franchisee can access the training module 18 and choose one or more training sessions 22.

By way of example only, and not to be construed in a limiting sense, the franchiser could be in the business of franchising the sale and production of cut fruit arrangements. Accordingly, the franchiser would desire to have each of the franchisees make and sell the same cut fruit arrangements. In addition, the franchiser would likely require that the cut fruit arrangements be made in the same manner, using the same equipment, amongst all of the franchisees. Accordingly, it may be desirable that the franchisees all receive the same training instruction.

Accordingly upon accessing the website 12, a user can choose one or more training sessions 22. This may be accomplished in any one of a number of different ways depending on how the website 12 is set up. For example, drop-down menus, clicking, via a mouse or other pointing device, on an item that may direct the user to another web page that provides a list of selectable training sessions, and the like may be employed.

A user, upon, or subsequent to accessing the website 12 may be required to enter security protocols, such as, for example, entering a user name and password. The present invention is not limited in this regard as other security-protocols such as biometrics and card swiping devices may also be employed.

Once a training session 22 is selected, the software is operable to cause step-by-step training instructions to be displayed on a computer display at a user's location. The training session can be interactive with the user having to select displayed items, make choices, and the like. However, the present invention is not limited in this regard as the instructions may simply be displayed on the screen with the user being able to advance to the next instruction by clicking an icon, hitting a key on a keyboard operable with the display, or where a touch screen display is employed, the user can advance the instruction by touching the screen in an appropriate location.

The training module may be configured so that if the user completes a training session, as indicated by element 24, the user can select another training session 22. However, if the user does not complete the training session, as indicated by element 26, the user can be returned to the training session 22 and will not be able to advance to another training session until the prior session is completed. In addition, the above-described software is operable to accommodate supervisory personnel, or others, determining the training sessions a user can access. Such training sessions can then be taken by the user. The software can be configured to operate such that a user is required to complete a training session prior to accessing another training session. The software can also be configured to allow the supervisory personnel to monitor the user's progress in real time. The user can also be prevented from accessing training sessions other than those proscribed by the supervisory personnel until such time as the proscribed training sessions are completed.

Moreover, the software can also be operable to allow a user to stop a training session before finishing and the next time that user logs on to the software, the training session will continue from the point at which the user stopped it.

Upon successful completion of a training session 22, the software can be operable to administer a test 28 to ascertain if the user has retained the information conveyed in the training session. Upon completion of the test 28, the software is operable to score the test. If the user receives a passing score 30, the user can be allowed to select another training session 22. Conversely, if a failing score 32 is received the user can be prevented from accessing additional training sessions until such time as the failed test 32 is passed. Information relevant to the training sessions 22 that have been accessed, completed, passed and failed can be stored in the database 34. The database 34 and the database 16 could be the same or different databases. The stored information therein may be accessible by an entity, such as, but not limited to a franchisor. In addition, the software can be operable to alert, via email, fax, voice message, text message, and the like, a supervisor, should a user fail a test or otherwise not meet desired training session requirements.

Similarly, the software can be configured to provide alerts remotely entered. For example, if the software is operable on several computers and/or at more than one location, an alert can be broadcast to each computer. The alert can take the form of a warning concerning an undesirable or dangerous condition, or can simply be used to convey a general message. Audible or visual signals can be employed to provide notification of an alert.

The software 14 also includes an instruction module 20 accessible via the website 12 in the same manner as described above regarding accessing the training module 18. Upon accessing the instruction module 20, a user can select, via mouse click, other pointing device, touch screen, and the like, an instruction session 36 relevant to a particular operation. The instruction session 36 could be directed to any one of a number of things, such as but not limited to product preparation, equipment cleaning and maintenance, order entry, equipment operation, combinations thereof, and the like. Information relevant to the selected instruction session(s) can be stored in the database 34.

The above-described software 14, database 16 and website 12 can also be operable and co-operable to facilitate the entry and processing of orders. Upon receipt, an order 38 can be entered into the database 16 or other database operable with the software 14. Information such as the products or services ordered, quantities, delivery dates, and the like can be stored in the database 16. To process an order 40, a user can access the order via the website 12 in much the same manner used to access the above-described training and instruction modules, 18 and 20 respectively. Once accessed, one or more orders can be viewed on a display. Depending on what is ordered one or more instruction sessions 36 may be relevant. The user can access the appropriate instruction session(s) 36 and proceed to process the order. Upon accessing an order the software 14 can be operable to provide a list of materials and equipment needed. Where several orders are to be fulfilled in a given time frame, an equipment and materials list can be displayed for all of the orders. For example, where the orders pertain to the provision of cut fruit arrangements, accessing said orders could include displaying a list of the fruits and amounts thereof needed, as well as the number of different cut pieces required to fulfill the orders.

The software 14 could also be employed to track inventory. As orders 38 are fulfilled, and inventory depleted, the software 14 can provide a user with information on current inventory levels as well as provide alerts when inventories reach predetermined levels. Moreover, the software 14 and database 16 can be updated by supervisory or other authorized personnel. In this manner, new instruction sets, training sessions, products, and the like can be added. In addition, messages and other information can be uploaded and thereby made accessible, for example, by all of the franchises of a particular business.

While the method set forth herein has been described as operating in cooperation with a website, it is not limited in this regard. The above-described software and database can also be resident on a single computer, or can be resident on a server forming part of a network. The network can be an intranet wherein one or more computers are in communication with the server. The server can also be resident at one location and in communication with one or more remotely located computers. The communication with the server can be accomplished via a wireless connection, over a virtual private network, or the like. The remotely located computers can be configured so that software that is only sufficient to provide access to the server is resident on the remotely located computers. The software containing the above-described training module and instructions module can be resident on the server so that should a remotely located computer be damaged or stolen, data as well as the software are still intact on the server. As used herein, the term "server" should be broadly construed to include more than one server or computer.

In the above-described embodiments, said instruction sets and said training sessions can include one or more of a video component, pictorial component, graphics component, textual component and an audio component.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A computer implemented system for administrating quality control and coordinating consistency relating to the business of franchising the sale and production of cut fruit arrangements throughout a franchise network having a central franchisor and distributed franchises comprising:

a database under the control of a cut fruit franchisor identifying selected cut fruit arrangements to be offered by franchisees;

said database including tasks affiliated with the production of said cut fruit arrangements, said tasks being specific to a cut fruit arrangement;

software operable with a computer having a display associated therewith, said software including a training module related to the production of cut fruit arrangements and an instruction module relating to the production of said cut fruit arrangements, said training module and said instruction module being accessible by a user at a user location remote from the cut fruit franchisor, said training module including at least one training session selectable by said user and said instruction module including at least one instruction set selectable by said user relating to at least one of said offered products of said cut fruit arrangements for educating a user on the required tasks related to the production of said products;

said software, said computer and said display operating to provide and display step-by-step training instructions for performing one or more tasks upon selection of one of said training sessions by said user relating to the production of one of said desired cut fruit arrangements;

upon selection of one of said instruction sets said software, said computer, and said display being operable to provide and display step-by-step instructions for performing one or more tasks associated with the preparation of a cut fruit arrangement to assist in the manufacturing of said cut fruit arrangement;

software being operable to allow for the entry of order information relating to a cut fruit arrangement; and software for providing production relevant information relating to a cut fruit arrangement based upon said order information enabling production of product for a consumer based upon said order information and;

said production information including displaying a list of fruits and amounts needed thereof as well as the number of different cut pieces required to fulfill the orders.

2. The system of claim 1 further including a website in cooperation with said software, said website being operable to display one or more orders to be processed and wherein information may be displayed relating to operational tasks required for completing said order.

3. The system of claim 2 wherein said operational tasks include the management of inventory of fruits necessary to complete the cut fruit arrangements in said orders.

4. The system of claim 3 wherein said order information is uploaded to said database enabling the franchisor to monitor the operations of a particular franchisee.

5. The system of claim 1 further including tests relating to the tasks identified by said instruction module, the performance of said tests being uploaded to said database enabling the franchisor to monitor the operations of a particular franchisee.

* * * * *